United States Patent [19]

Hadeler

[11] Patent Number: 5,416,585
[45] Date of Patent: May 16, 1995

[54] FIBER OPTIC GYRO DRIFT RATE COMPENSTION BASED ON TEMPERATURE

[75] Inventor: Theodore T. Hadeler, Montvale, N.J.

[73] Assignee: AlliedSignal Inc., Morris Township, Morris Co., N.J.

[21] Appl. No.: 245,936

[22] Filed: May 19, 1994

[51] Int. Cl.⁶ .............................................. G01C 19/72
[52] U.S. Cl. .................................................... 356/350
[58] Field of Search .............................. 356/345, 350; 250/227.19, 227.27; 242/7.03

[56] References Cited

U.S. PATENT DOCUMENTS 4,702,599 10/1987 Mohn ................................... 356/350
5,245,687 9/1993 Usui ..................................... 356/350

FOREIGN PATENT DOCUMENTS 0454113 10/1991 European Pat. Off. ............. 356/350
2157425 10/1985 United Kingdom ................ 356/350

Primary Examiner—Samuel A. Turner
Attorney, Agent, or Firm—Donald B. Paschburg

[57] ABSTRACT

The present invention provides a correction for fiber optic gyro drift rate error due to temperature effects based on either the temperature difference between the gyro housing and the sensor spool, or the rate of change of spool temperature. Although gyro drift rate error due to rates of temperature change are virtually unavoidable, adjustments can be made by sensing gyro temperature and calculating the required correction factor. This type of compensation is suited to high accuracy gyros when thermal disturbances are small, or to low accuracy gyros even when thermal disturbances are relatively large. Implementation of this method of compensation requires the development of appropriate electronic circuits to provide the required temperature correction to gyro output.

24 Claims, 6 Drawing Sheets

FIBER OPTIC GYRO DRIFT RATE COMPENSTION BASED ON TEMPERATURE

BACKGROUND OF THE INVENTION

1. Field of the Invention

The present invention relates to fiber optic gyroscopes and more particularly to compensation of thermally-induced drift rate errors in fiber optic gyroscopes.

2. Description of the Prior Art

Various types of sensors (angular position indicators and rate gyros) can exhibit significant temperature sensitivity to either temperature levels or rates of temperature change. In the search for instruments of greater accuracy, it has become necessary to either compensate for the resulting thermally-induced errors or to use heaters to provide a constant sensor temperature. Although heaters are used successfully to provide thermal control, they require additional power, an electronic controller, and result in higher average sensor operating temperatures.

The output of sensors that exhibit temperature level sensitivity, e.g., a predictable change in bias over temperature, can be readily corrected by means of a simple polynomial in temperature whose coefficients are determined by test, and whose value can be based on the output of an appropriately placed thermistor. However, compensation for sensors such as the fiber optic gyroscope (FOG) that exhibit sensitivity to small rates of temperature change is more difficult to achieve since the errors are not simple functions of temperature.

Electrolytic level sensors and plastic gyros also fall into this category. In the case of the level sensor, temperature measurement at the instrument was considered infeasible, and in the case of the plastic gyro, erratic thermal behavior precluded the development of a practical scheme of compensation. It should be noted that although the level sensor was thermally isolated, the electrolyte in the glass tube still exhibited erratic behavior because of the heat generated within the electrolyte itself. Erratic thermal behavior of the plastic gyro was attributed to the inherently low thermal conductivity of the plastic material used in its construction.

It is an object of the present invention to provide a means of correcting for sensor errors caused by thermal effects without the use of heaters and associated control electronics.

SUMMARY OF THE INVENTION

The present invention is a method of compensating for thermally-induced FOG drift rate errors by means of a simple correction factor. This correction factor is the product of a constant and either the temperature difference from the gyro housing to the sensor spool or the rate of temperature change of the sensor spool. This requires: (1) the monitoring of the temperature of both the gyro housing and the sensor coil spool and calculation of the temperature difference between them, or; (2) the monitoring of sensor spool temperature and calculation of its rate of temperature change.

These two methods of compensation are theoretically identical since the heat flow from the gyro housing to the sensor coil spool which causes gyro drift rate error, is proportional to both the temperature difference from the housing to the sensor coil spool and the rate of sensor spool temperature change.

The implementation of the proposed temperature compensation scheme requires the development of electronic circuits to provide the required temperature correction to gyro output.

DETAILED DESCRIPTION OF THE INVENTION

Figure 1:
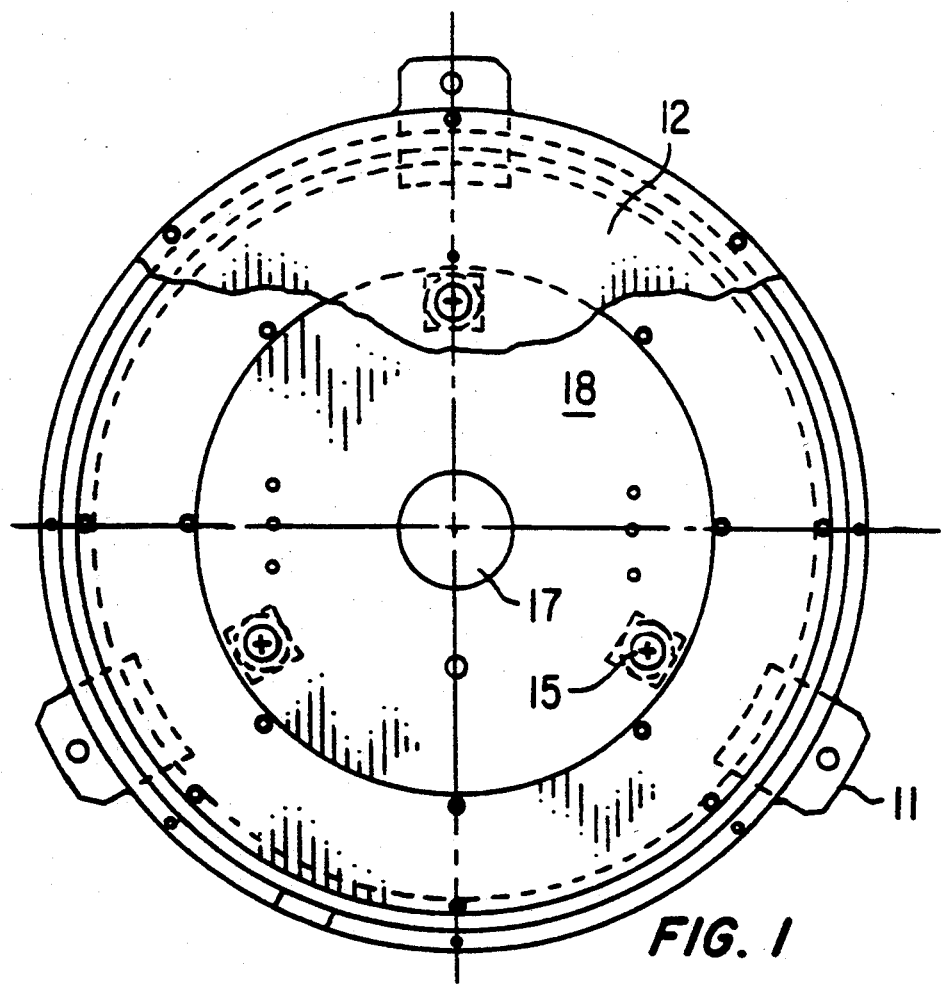
FIG. 1 illustrates a top view of a fiber optic gyroscope.
Figure 2:
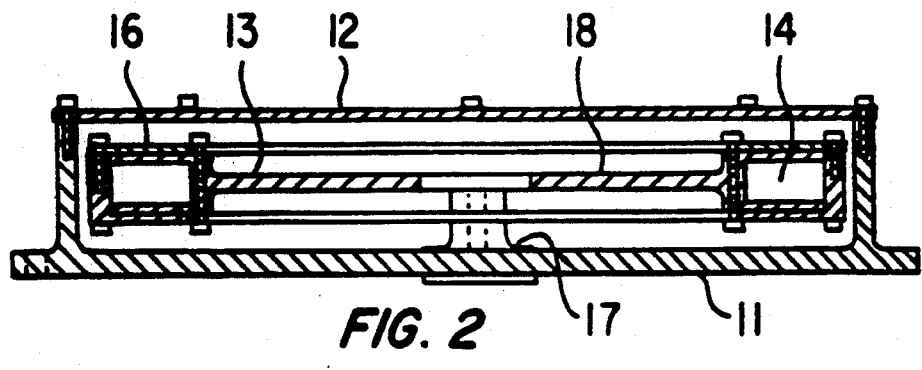
FIG. 2 illustrates a side cross-section view of a fiber optic gyroscope.

A typical fiber optic gyro (FOG) is illustrated in the top and side cross-section views shown in the attached FIGS. 1 and 2, respectively. The gyro consists of outer main housing 11 and cover 12 which forms an enclosure for spool 13 and quadra-polar wound glass fiber coil 14. Sensor coil spool 13 is mounted to the base of housing 11 on thermally insulated bushings 15. The quadra-polar wound glass fiber coil 14 is completely contained within the volume of two part enclosure 16 and sensor coil spool 13. Housing sensor 17 is mounted on main housing 11 and spool sensor 18 is mounted on sensor coil spool 13.

Figure 3:
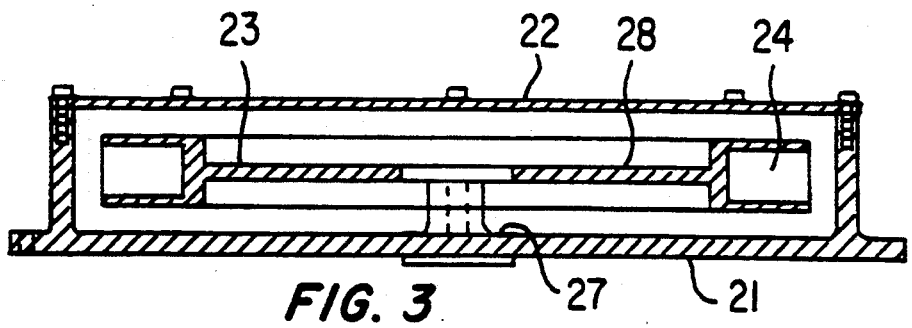
FIG. 3 illustrates a side cross-section view of a second embodiment of the present invention.

FIG. 3 illustrates a side cross-section view of a second embodiment of the present invention. This embodiment of the fiber optic gyro includes main housing 21 and cover 22 which forms an enclosure for spool 23 and quadra-polar wound glass fiber coil 24. The quadra-polar wound glass fiber coil 24 is not contained within a two part enclosure. Housing sensor 27 is mounted on main housing 21 and spool sensor 28 is mounted on spool 23. In another embodiment, cover 22 and the sides of housing 21 could be removed.

Figure 4:
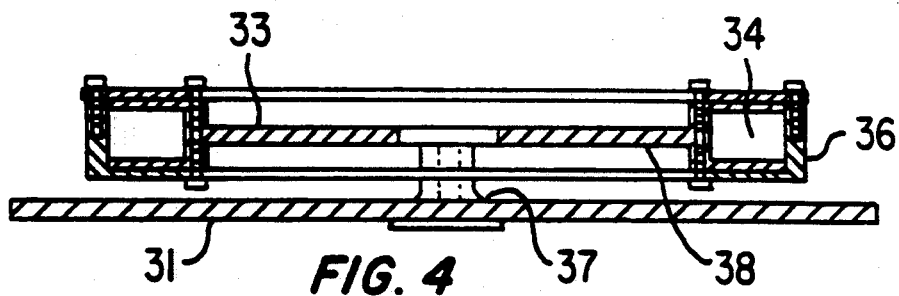
FIG. 4 illustrates a side cross-section view of a third embodiment of the present invention.

FIG. 4 illustrates a side cross-section view of a third embodiment of the present invention. This embodiment of the fiber optic gyro does not include a cover. The quadra-polar wound glass fiber coil 34 is contained within two part enclosure 36 and spool 33. Ambient sensor 37 is mounted on main housing 31 and spool sensor 38 is mounted on the shielded side of spool 33.

In all of the above embodiments the sensors are located to monitor the temperature of both the gyro housing and the sensor coil spool. Associated electronic circuitry (not shown) connected to these sensors calculates the temperature difference between the gyro housing and the sensor coil spool and produces and applies a correction factor to the output of the fiber optic gyro. In other embodiments the sensors could just be located on the sensor coil spool and the associated electronic circuitry would monitor and calculate the rate of temperature change of the sensor coil spool.

Glass fiber optic gyros are extremely sensitive to changes in temperature. Temperature gradients in the coil have no effect on gyro accuracy as long as they do not change with time. However, any non-uniform change in temperature over time will cause an unequal effect on the index of refraction of the glass fiber, resulting in an apparent drift rate error. This sensitivity to temperature change is known as the "Shupe" effect to those practiced in the art.

The quadra-polar wound glass coil design is symmetrical about the plane of the center of the fiber coil and the exit/entry point into the coil. Theoretically, this winding is not sensitive to changes in thermal gradients along this plane of symmetry. However, very small changes in thermal gradients along the cross-axis over time will result in drift rate error.

It is helpful to view the actual coil as an imperfect structure which is not uniform in the circumferential direction. This being in fact the case, drift rate error will be zero only when the temperature of the coil remains constant. Because of the lack of uniformity in the glass coil, any change in temperature external to the coil will cause a variable effect on internal coil temperatures along its circumference. This effect will exist even if the exterior temperature changes uniformly at a uniform rate. And, since the introduction of sensors in the glass winding would cause additional mechanical distortions in the glass coil itself, effective compensation by direct measurement of coil temperature gradients is not deemed practical.

However, a means of compensation can be developed by recognizing that changes in internal coil temperatures and, therefore, temperature gradients are a response to changes in external temperatures. The theoretical basis for this is shown in the following simple relationship: Equation 1:

$$Q = (1/R)(T_1 - T_2) = (1/C)(dT_2/dt)$$

where:
Q = Heat Flow from Housing to Spool
$T_1$ = Housing Temperature
$T_2$ = Spool Temperature
R = Thermal Resistance Between Housing and Spool
C = Spool Thermal Capacitance
$dT_2/dt$ = Spool Temperature Time Rate of Change Thus, external temperatures must be changing with time in order for thermally-induced drift rate errors to occur. This is exactly the type of behavior observed during testing, where drift rate error is observed to be proportional to both the rate of change in spool temperature which is very close to that of the glass coil itself, and to the temperature difference between the housing and the sensor spool.

Figure 5:
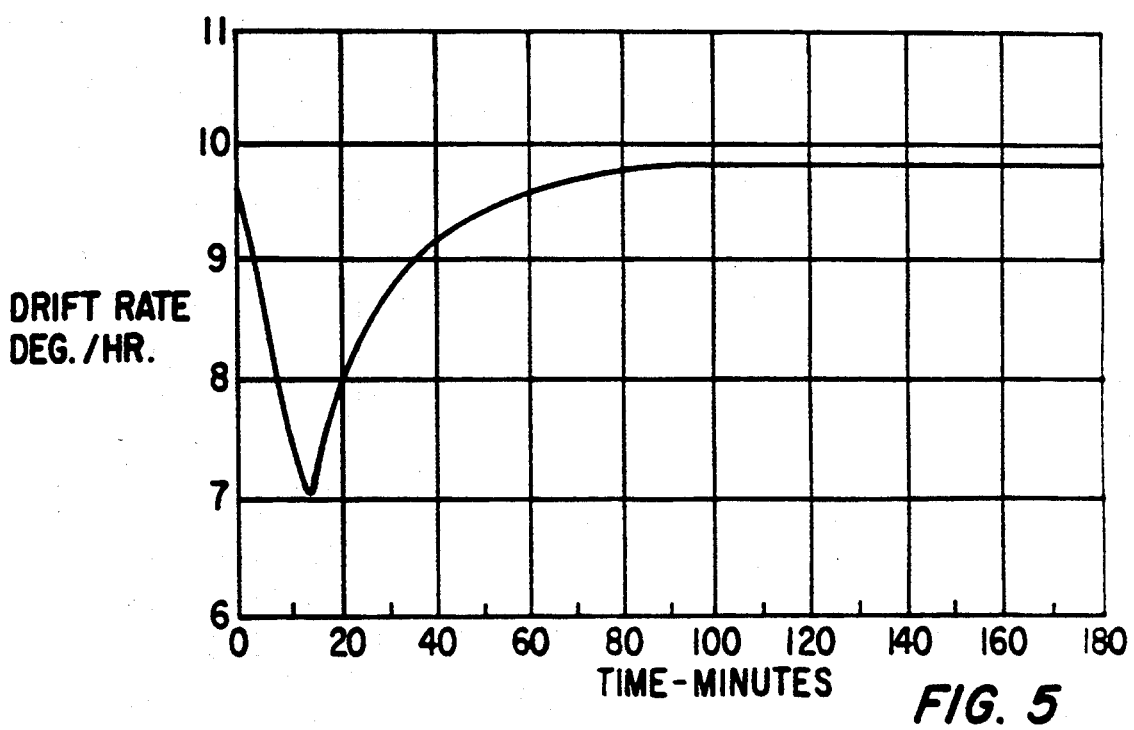
FIG. 5 illustrates the observed gyro drift rate versus time.
Figure 6:
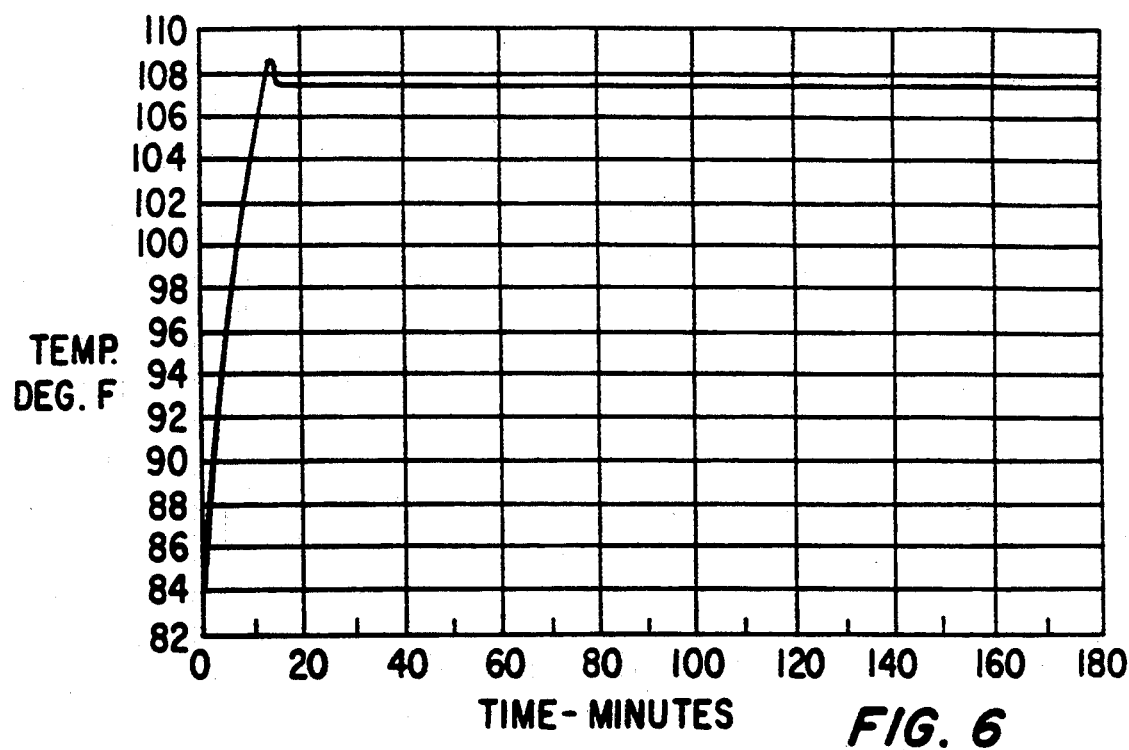
FIG. 6 illustrates the observed gyro housing temperature versus time.
Figure 7:
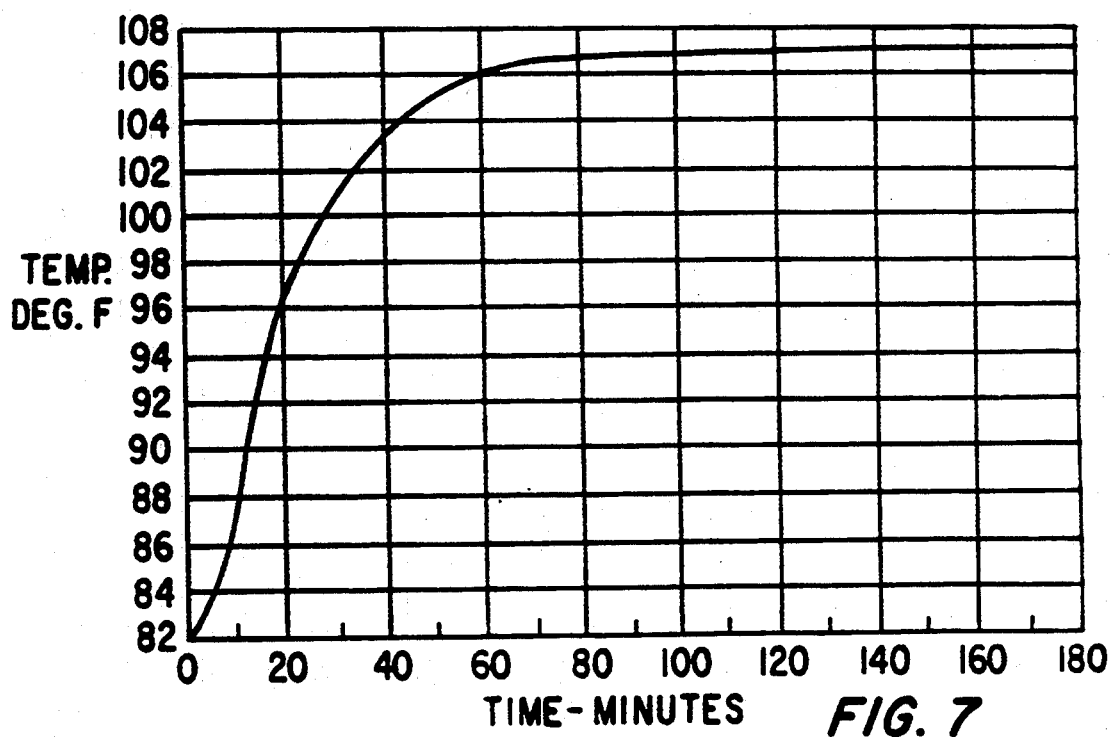
FIG. 7 illustrates the observed sensor spool temperature versus time.
Figure 8:
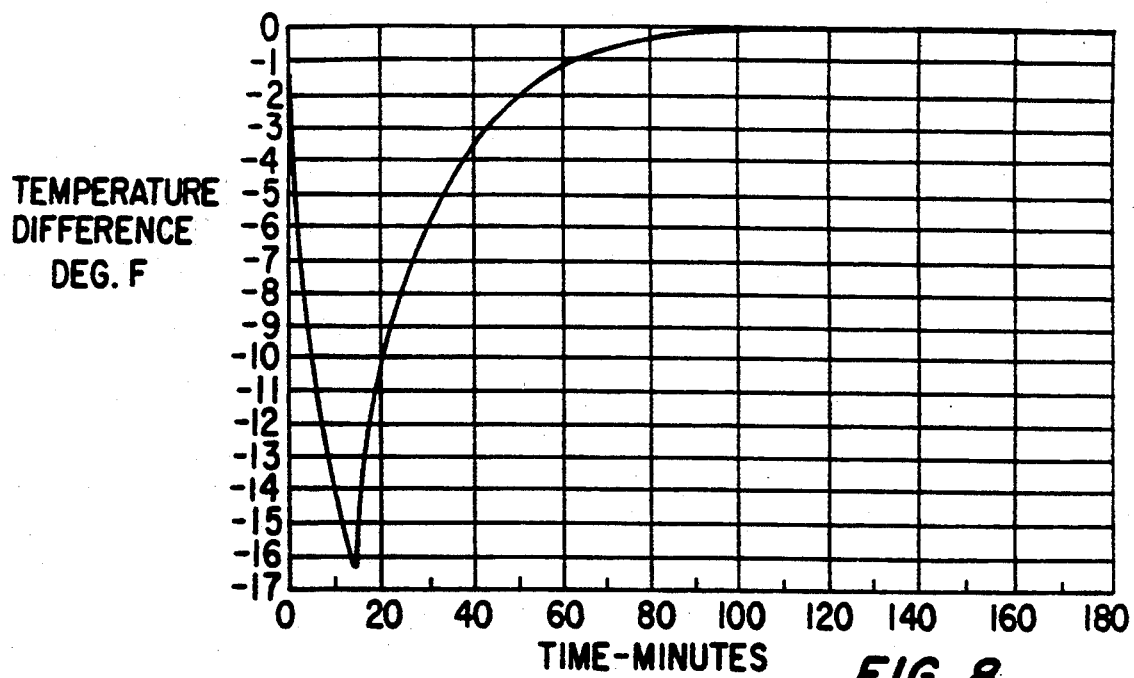
FIG. 8 illustrates the observed temperature difference between the sensor spool and gyro housing versus time.
Figure 9:
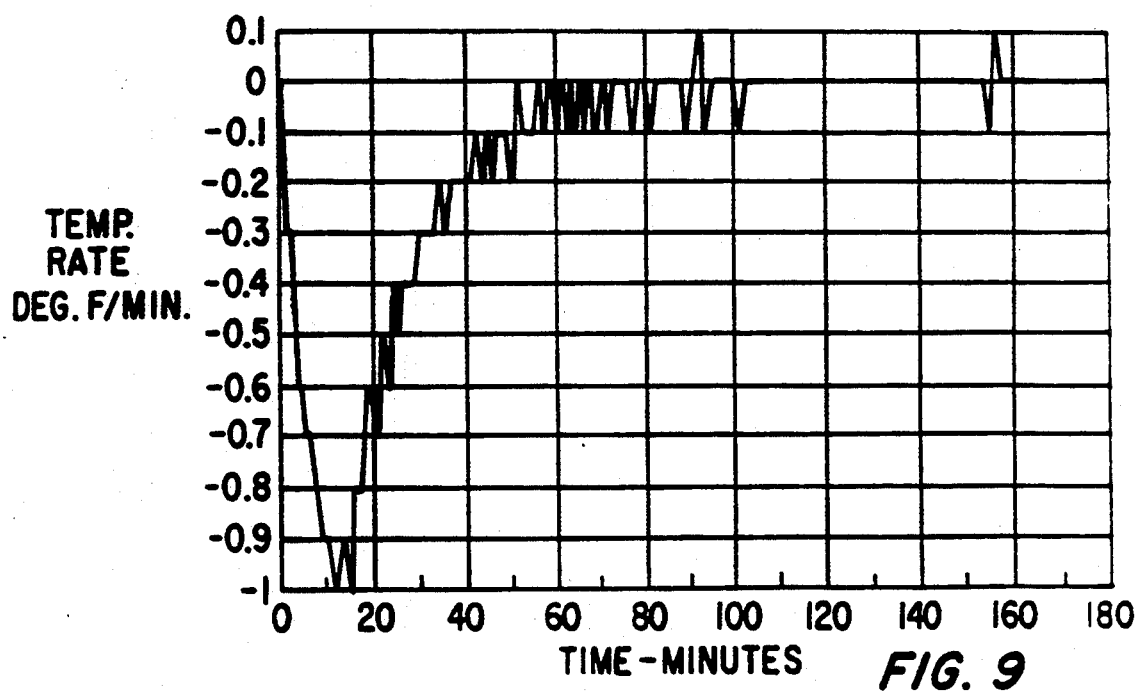
FIG. 9 illustrates the observed sensor spool temperature rate versus time.

Implementation of temperature compensation based on high rate warm-up tests conducted with a prototype FOG is illustrated in FIGS. 5 through 13. The original test data shows no apparent correlation between gyro drift rate shown in FIG. 5 and either the housing or spool temperatures shown in FIGS. 6 and 7, respectively. However, when the temperature difference between the housing and the spool is plotted as shown in FIG. 8, the resulting curve bears a striking similarity to the drift rate plot in FIG. 5. When the time rate of change of spool temperature is plotted as shown in FIG. 9, the same similarity to the drift rate plot of FIG. 5 is observed. These similarities confirm both the theoretical relationship described in Equation 1 above and the proposition that gyro drift error is caused by heat flow in the sensor coil.

Figure 10:
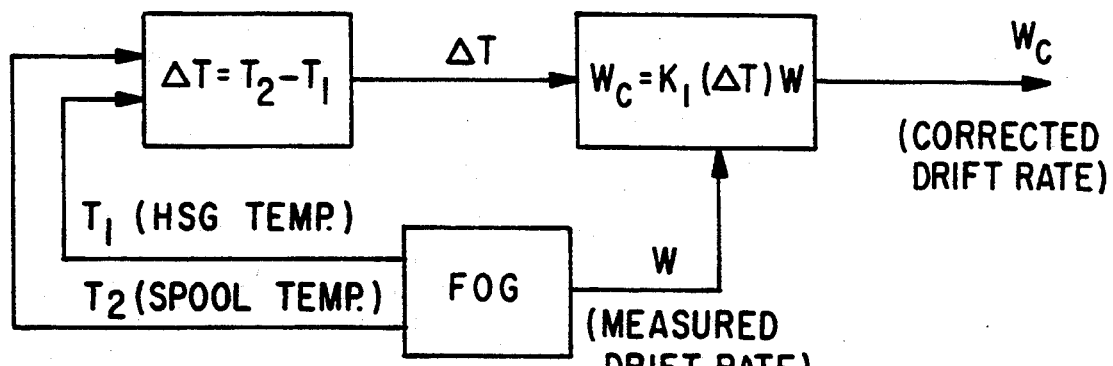
FIG. 10 illustrates a block diagram of drift error compensation based on the temperature difference between the sensor spool and the housing.
Figure 11:
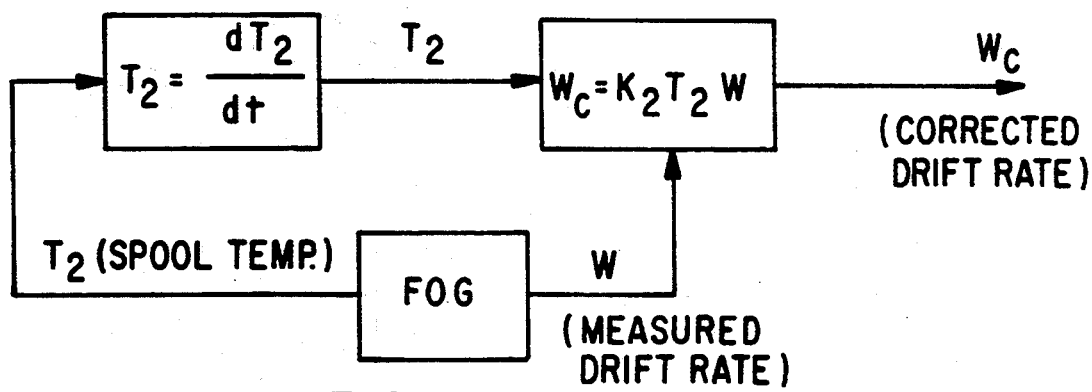
FIG. 11 illustrates a block diagram of drift error compensation based on sensor spool rate of temperature change.

Two proposed methods for correcting gyro drift rate error due to thermal effects are illustrated in the block diagrams shown in FIGS. 10 and 11. FIG. 10 illustrates the method of correcting gyro output by sensing gyro housing and spool temperatures, calculating the temperature difference, and multiplying the measured gyro drift rate (W) by the product of a constant ($K_1$) and the temperature difference ($\Delta T$) to obtain the corrected gyro output ($W_c$). The constant ($K_1$) is equal to the ratio of the drift rate range to the housing to spool temperature difference range, and has the value of 0.173 (deg/hr)/(deg F), as determined by the prototype test cited above.

FIG. 11 illustrates the method of correcting gyro output by sensing only spool temperature, calculating its temperature rate, and multiplying the measured gyro output (W) by the product of a constant ($K_2$) and the temperature rate ($dT_2/dt$). The constant ($K_2$) is equal to the ratio of drift rate range to the spool temperature rate range, and has the value of 2.823 (deg/hr)/(deg F/rain), as determined by the prototype test cited above.

Figure 12:
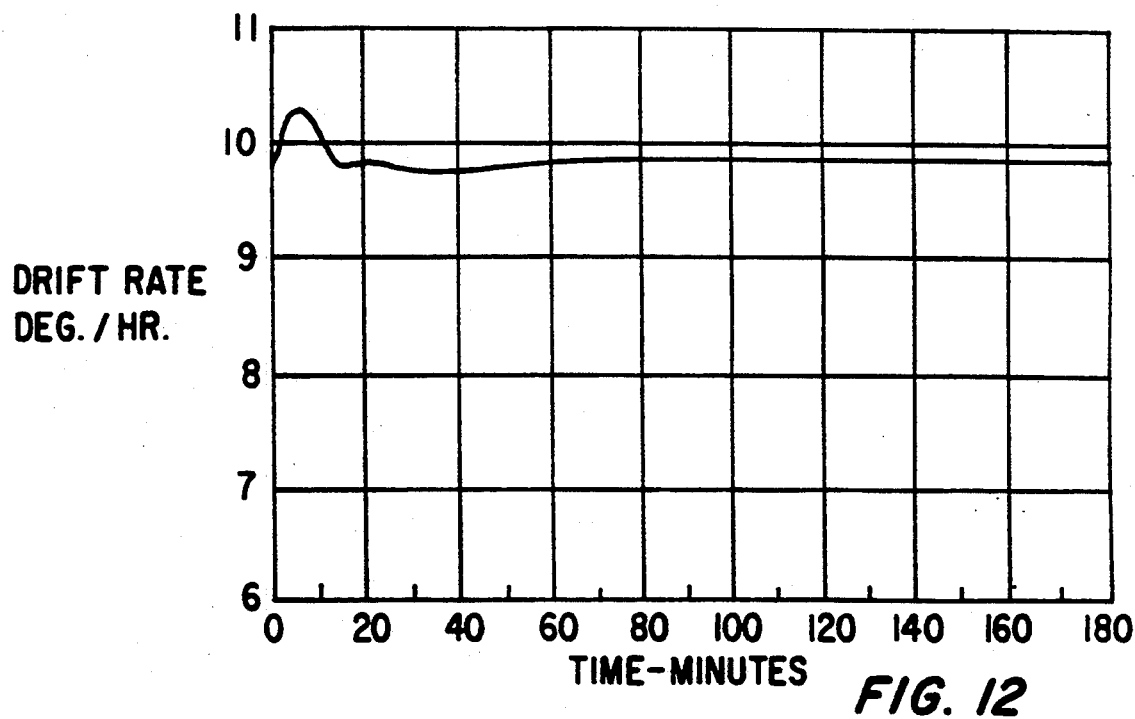
FIG. 12 illustrates gyro drift rate vs. time after adjustment based on sensor spool to housing temperature difference.
Figure 13:
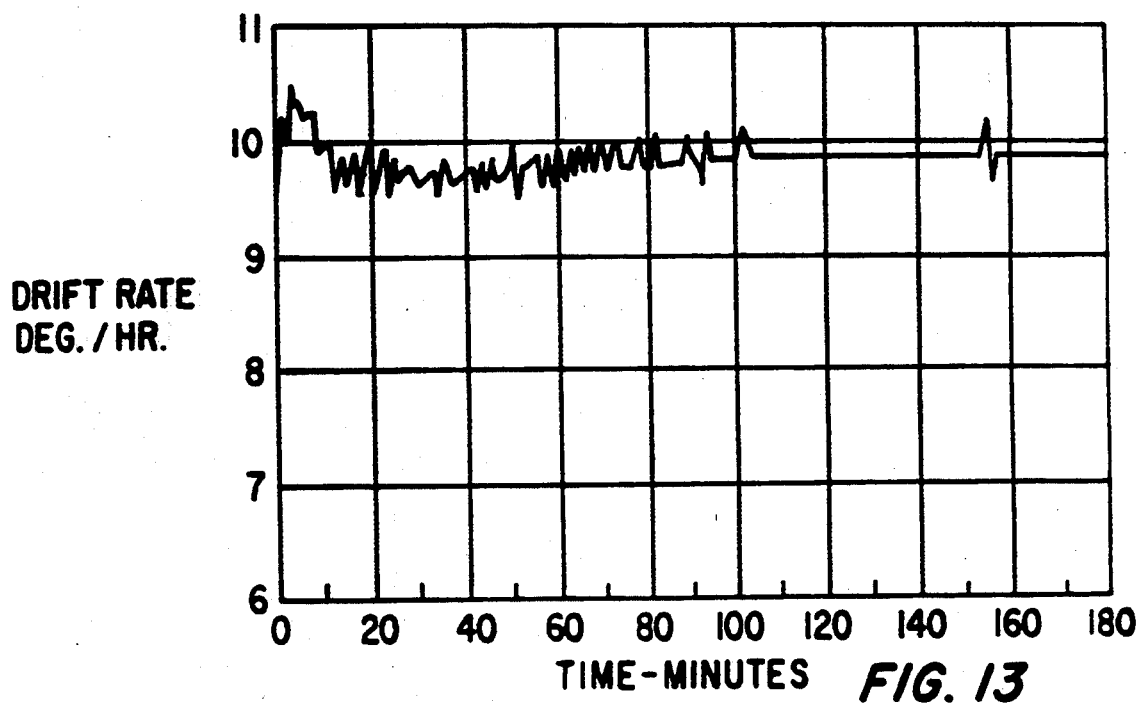
FIG. 13 illustrates gyro drift rate vs. time after adjustment based on sensor spool temperature rate.

The resulting adjusted gyro drift rate plots versus time for temperature difference and temperature rate compensation are described in FIGS. 12 and 13, respectively. Where the original gyro drift rate illustrated in FIG. 5 varied by about 28%, the temperature difference adjusted drift rate of FIG. 12 varies by about 5%, and the temperature rate adjusted drift rate of FIG. 13 (based on a five minute average) varies by about 9%. It should be noted that the adjusted drift rate curves of FIGS. 12 and 13 based on housing to spool temperature difference and spool temperature rate respectively are quite similar except for the variations in rate caused by the limits of thermocouple accuracy.

Gyro drift rate corrections based on gyro housing to spool temperature difference of spool temperature rate to compensate for thermally-induced drift rate errors are considered feasible. It is not intended that this invention be limited to the hardware arrangement shown or operational procedures shown disclosed. This invention includes all of the alterations and variations thereto as encompassed within the scope of the claims as follows:

What is claimed is:

1. A fiber optic gyro having drift rate compensation comprising:
   an outer main housing;
   a plurality of thermally insulated bushings connected to said outer main housing;
   a sensor coil spool mounted to said plurality of thermally insulated bushings;
   an enclosure at outside edge of said sensor coil spool;
   a quadra-polar wound glass fiber coil completely contained within said enclosure and said sensor coil spool; and, temperature sensor means connected to said outer main housing, said sensor coil spool and output of said fiber optic gyro for developing a corrective drift rate signal, said temperature sensor means providing a significant reduction in thermally-induced gyro drift rate error thereby increasing accuracy of said fiber optic gyro.

2. A fiber optic gyro having drift rate compensation as claimed in claim 1 wherein said temperature sensor means comprises:
   temperature sensors located on said outer main housing and a shielded side of said sensor coil spool; and,
   electronic circuitry means connected to said temperature sensors for producing and applying a correction factor to said output of said fiber optic gyro which is a product of a constant determined by test and temperature difference between said outer main housing and said sensor coil spool.

3. A fiber optic gyro having drift rate compensation as claimed in claim 2 wherein said electronic circuitry means comprises:
   means for producing control parameters of housing to spool temperature difference which by application of additional averaging, smoothing and algorithms to a correction factor can produce greater gyro accuracy over a range from low to high rates of heating and temperature change.

4. A fiber optic gyro having drift rate compensation as claimed in claim 1 further comprising:
   a cover completely enclosing said sensor coil spool, said enclosure and said quadra-polar wound glass fiber coil.

5. A fiber optic gyro having drift rate compensation as claimed in claim 4 wherein said temperature sensor means comprises:
   temperature sensors located on said outer main housing and said sensor coil spool; and,
   electronic circuitry means connected to said temperature sensors for producing and applying a correction factor to said output of said fiber optic gyro which is a product of a constant determined by test and temperature difference between said outer main housing and said sensor coil spool.

6. A fiber optic gyro having drift rate compensation as claimed in claim 5 wherein said electronic circuitry means comprises:
   means for producing control parameters of housing to spool temperature difference which by application of additional averaging, smoothing and algorithms to a correction factor can produce greater gyro accuracy over a range from low to high rates of heating and temperature change.

7. A fiber optic gyro having drift rate compensation comprising:
   an outer main housing;
   a plurality of thermally insulated bushings connected to said outer main housing;
   a sensor coil spool mounted to said plurality of thermally insulated bushings;
   an enclosure at outside edge of said sensor coil spool;
   a quadra-polar wound glass fiber coil completely contained within said enclosure and said sensor coil spool; and,
   temperature sensor means connected to said sensor coil spool and output of said fiber optic gyro for developing a corrective drift rate signal, said temperature sensor means providing a significant reduction in thermally-induced gyro drift rate error thereby increasing accuracy of said fiber optic gyro.

8. A fiber optic gyro having drift rate compensation as claimed in claim 7 wherein said temperature sensor means comprises:
   temperature sensors located on a shielded side of said sensor coil spool; and,
   electronic circuitry means connected to said temperature sensors for producing and applying a correction factor to said output of said fiber optic gyro which is a product of a constant determined by test and rate of temperature change of said sensor coil spool.

9. A fiber optic gyro having drift rate compensation as claimed in claim 8 wherein said electronic circuitry means comprises:
   means for producing control parameters of spool temperature rate, which by application of additional averaging, smoothing and algorithms to a correction factor can produce greater gyro accuracy over a range from low to high rates of heating and temperature change.

10. A fiber optic gyro having drift rate compensation as claimed in claim 7 further comprising:
    a cover completely enclosing said sensor coil spool, said enclosure and said quadra-polar wound glass fiber coil.

11. A fiber optic gyro having drift rate compensation as claimed in claim 10 wherein said temperature sensor means comprises:
    temperature sensors located on said sensor coil spool; and,
    electronic circuitry means connected to said temperature sensors for producing and applying a correction factor to said output of said fiber optic gyro which is a product of a constant determined by test and rate of temperature change of said sensor coil spool.

12. A fiber optic gyro having drift rate compensation as claimed in claim 11 wherein said electronic circuitry means comprises:
    means for producing control parameters of spool temperature rate, which by application of additional averaging, smoothing and algorithms to a correction factor can produce greater gyro accuracy over a range from low to high rates of heating and temperature change.

13. A fiber optic gyro having drift rate compensation comprising:
    an outer main housing;
    a plurality of thermally insulated bushings connected to said outer main housing;
    a sensor coil spool mounted to said plurality of thermally insulated bushings;
    a quadra-polar wound glass fiber coil connected to said sensor coil spool; and,
    temperature sensor means connected to said outer main housing, said sensor coil spool and output of said fiber optic gyro for developing a corrective drift rate signal, said temperature sensor means providing a significant reduction in thermally-induced gyro drift rate error thereby increasing accuracy of said fiber optic gyro.

14. A fiber optic gyro having drift rate compensation as claimed in claim 13 wherein said temperature sensor means comprises:

temperature sensors located on said outer main housing and said sensor coil spool; and, electronic circuitry means connected to said temperature sensors for producing and applying a correction factor to said output of said fiber optic gyro which is a product of a constant determined by test and temperature difference between said outer main housing and said sensor coil spool.

15. A fiber optic gyro having drift rate compensation as claimed in claim 14 wherein said electronic circuitry means comprises:

means for producing control parameters of housing to spool temperature difference which by application of additional averaging, smoothing and algorithms to a correction factor can produce greater gyro accuracy over a range from low to high rates of heating and temperature change.

16. A fiber optic gyro having drift rate compensation as claimed in claim 13 further comprising:

a cover completely enclosing said sensor coil spool and said quadra-polar wound glass fiber coil.

17. A fiber optic gyro having drift rate compensation as claimed in claim 16 wherein said temperature sensor means comprises:

temperature sensors located on said outer main housing and said sensor coil spool; and, electronic circuitry means connected to said temperature sensors for producing and applying a correction factor to said output of said fiber optic gyro which is a product of a constant determined by test and temperature difference between said outer main housing and said sensor coil spool.

18. A fiber optic gyro having drift rate compensation as claimed in claim 17 wherein said electronic circuitry means comprises:

means for producing control parameters of housing to spool temperature difference which by application of additional averaging, smoothing and algorithms to a correction factor can produce greater gyro accuracy over a range from low to high rates of heating and temperature change.

19. A fiber optic gyro having drift rate compensation comprising:

an outer main housing;

a plurality of thermally insulated bushings connected to said outer main housing;

a sensor coil spool mounted to said plurality of thermally insulated bushings;

a quadra-polar wound glass fiber coil connected to said sensor coil spool;

temperature sensor means connected to said said sensor coil spool and output of said fiber optic gyro for developing a corrective drift rate signal, said temperature sensor means providing a significant reduction in thermally-induced gyro drift rate error thereby increasing accuracy of said fiber optic gyro.

20. A fiber optic gyro having drift rate compensation as claimed in claim 19 wherein said temperature sensor means comprises:

temperature sensors located only on said sensor coil spool; and, electronic circuitry means connected to said temperature sensors for producing and applying a correction factor to said output of said fiber optic gyro which is a product of a constant determined by test and rate of temperature change of said sensor coil spool.

21. A fiber optic gyro having drift rate compensation as claimed in claim 20 wherein said electronic circuitry means comprises:

means for producing control parameters of spool temperature rate, which by application of additional averaging, smoothing and algorithms to a correction factor can produce greater gyro accuracy over a range from low to high rates of heating and temperature change.

22. A fiber optic gyro having drift rate compensation as claimed in claim 19 further comprising:

a cover completely enclosing said sensor coil spool and said quadra-polar wound glass fiber coil.

23. A fiber optic gyro having drift rate compensation as claimed in claim 22 wherein said temperature sensor means comprises:

temperature sensors located only on said sensor coil spool; and, electronic circuitry means connected to said temperature sensors for producing and applying a correction factor to said output of said fiber optic gyro which is a product of a constant determined by test and rate of temperature change of said sensor coil spool.

24. A fiber optic gyro having drift rate compensation as claimed in claim 23 wherein said electronic circuitry means comprises:

means for producing control parameters of spool temperature rate, which by application of additional averaging, smoothing and algorithms to a correction factor can produce greater gyro accuracy over a range from low to high rates of heating and temperature change.

* * * * *